March 21, 1933.  W. H. SMOLA, SR  1,902,671
SAW
Filed May 25, 1932

INVENTOR.
W.H. Smola Sr.
BY Harry W. Johnson
ATTORNEYS.

Patented Mar. 21, 1933

1,902,671

UNITED STATES PATENT OFFICE

WILLIAM H. SMOLA, SR., OF CENTRAL CITY, IOWA

SAW

Application filed May 25, 1932. Serial No. 613,497.

My invention relates to saws, more particularly to circular saws used in the cutting of lumber and the like, and it consists in the constructions, combinations, and arrangements herein shown and described.

A primary purpose of my invention is to provide a saw, preferably of the circular type, which will have its teeth so formed that a saving in the power necessary to operate said saw will result.

A further object of my invention is to provide a saw of the type described which will have its teeth so formed that scarring, scoring, or gouging of the surface of the lumber adjacent the cut will not take place.

A still further object of my invention is to provide a saw of the type described the teeth of which are so formed that they will readily resist any deformation thereof that might occur due to stresses and strains set up therein during the cutting operation.

A yet further object of my invention is to provide a device of the type described which is of simple formation, easy to manufacture, and will not get out of order easily.

Other objects and advantages will appear as the specification proceeds and the device will be more particularly defined in the appended claim.

Figure 1:
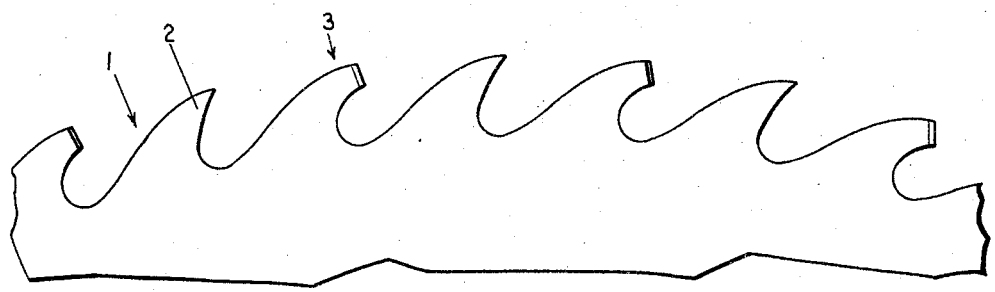
Figure 2:
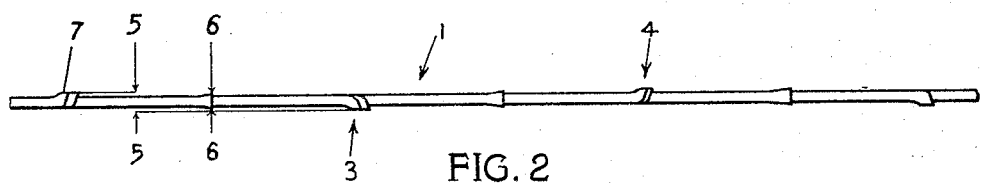
Figure 3:
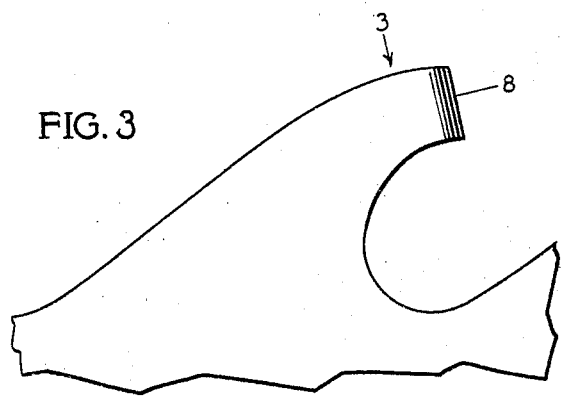
Figure 5:
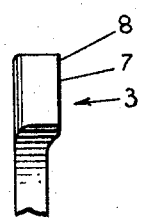
Figure 4:
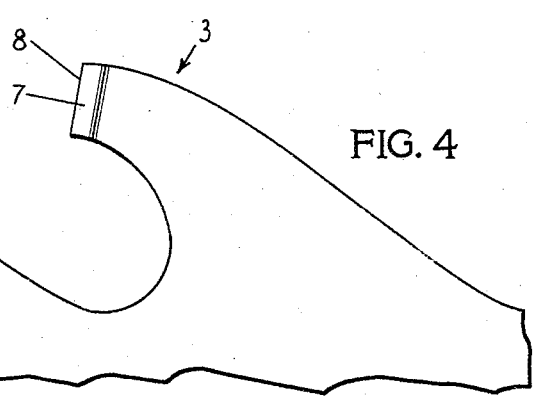
Figure 6:
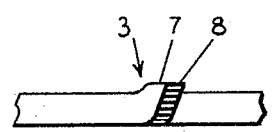

My invention is illustrated in the accompanying drawing forming a part of this application, in which Figure 1 is a fragmentary elevational view of a portion of a saw equipped with teeth according to my invention, Figure 2 is a top plan view of the device of Figure 1, Figure 3 is a fragmentary detail elevational view of one of the portions of my device, Figure 4 is a fragmentary detail elevational view of the opposite side of Figure 3, Figure 5 is a fragmentary detail elevational view of the tooth shown in Figure 3 as seen from the right of the said figure, and Figure 6 is a fragmentary detail plan view of the tooth of Figure 3 as seen from above.

In carrying out my invention I may make use of an ordinary disc saw 1 having the teeth 2 of conventional construction.

In adapting this saw blade to my invention I bend by a swaging operation the extremities only of alternate teeth in alternately opposite directions as indicated most clearly at 3 and 4 in Figure 2. This action thickens the ends of the swaged teeth as indicated in Figure 2 at 5—5, at which point it will be observed that the distance between the lateral edges of two of the alternately bent teeth is greater than the width of an unbent tooth, indicated at 6—6. The swaging operation brings about the formation of a wall 7, which lends support to the cutting edge 8 of the tooth, prevents the same from gouging into the side wall adjacent the cut, and smooths the surface adjacent the cut.

From the foregoing description, the use and operation of my device is easily understood. When the saw is put into operation in the usual manner, the teeth with the laterally extending cutting edges will engage the work in an easy and efficient manner not capable of being accomplished by teeth of ordinary formation, because of the nature of the cutting edge. The walls adjacent said laterally extending cutting edges formed by the swaging operation will assure strength to said cutting edges when they engage the work thus preventing the tooth from "pulling into" the material, that is, from springing sidewise when the tooth meets a harder portion of the wood causing a tendency to gouge the work.

It is seen that I have provided a saw that improves the quality of the "cut" by performing said cutting operation without scarring, scoring, or gouging the sides of the lumber or other material adjacent said cut.

I claim:

A saw consisting of a series of teeth, certain of which have their cutting edges extending in the direction of motion of the saw and certain of which have laterally extending cutting edges, the teeth having the laterally extending cutting edges being bent in alternately opposite directions to form said edges, the side walls of said teeth opposite said cutting edges being co-planar with the face of the saw, and shoulders behind the cutting edges of said bent teeth on the side thereof towards which the teeth are bent, said bent teeth having a distance between the cutting edges of oppositely bent teeth greater than the width of the teeth having cutting edges extending in the direction of motion of the saw, whereby the edge of the cut is smoothed by said bent teeth.

W. H. SMOLA, Sr.